(12) United States Patent
Peterson (10) Patent No.: US 8,375,138 B2
(45) Date of Patent: Feb. 12, 2013

(54) COMPUTER SYSTEM WITH TRUE VIDEO SIGNALS

(75) Inventor: David A. Peterson, Cazenovia, NY (US)

(73) Assignee: FH Innovations, Ltd, Markham, Ontario ( * ) Notice: Subject to any disclaimer, the term of this patent is extended or adjusted under 35 U.S.C. 154(b) by 540 days.

(21) Appl. No.: 12/613,389

(22) Filed: Nov. 5, 2009

(65) Prior Publication Data
US 2010/0115125 A1    May 6, 2010

Related U.S. Application Data

(60) Provisional application No. 61/111,608, filed on Nov. 5, 2008.

(51) Int. Cl.
    *G06F 15/16* (2006.01)
(52) U.S. Cl. .......... 709/231; 709/236; 715/719
(58) Field of Classification Search .......... 709/231, 709/326; 715/719
    See application file for complete search history.

(56) References Cited

U.S. PATENT DOCUMENTS

| | | | | |
|---|---|---|---|---|
| 4,949,169 A | * | 8/1990 | Lumelsky et al. | 348/14.12 |
| 5,119,188 A | * | 6/1992 | McCalley et al. | 725/93 |
| 5,764,889 A | * | 6/1998 | Ault et al. | 726/17 |
| 5,794,018 A | * | 8/1998 | Vrvilo et al. | 713/400 |
| 6,657,625 B1 | * | 12/2003 | Chik et al. | 345/467 |
| 7,715,481 B2 | * | 5/2010 | Xie | 375/240.26 |
| 2006/0206904 A1 | * | 9/2006 | Watkins et al. | 719/321 |
| 2007/0035470 A1 | * | 2/2007 | Lee et al. | 345/1.1 |
| 2008/0055191 A1 | | 3/2008 | Craig et al. | |
| 2008/0082665 A1 | * | 4/2008 | Dague et al. | 709/226 |
| 2009/0083450 A1 | | 3/2009 | Peterson | |
| 2009/0083630 A1 | | 3/2009 | Peterson | |
| 2009/0083829 A1 | | 3/2009 | Peterson | |

OTHER PUBLICATIONS

U.S. Appl. No. 60/973,923, filed Sep. 20, 2007, Peterson.

* cited by examiner

*Primary Examiner* — Thomas Dailey
(74) *Attorney, Agent, or Firm* — George R. McGuire; Bond Schoeneck & King PLLC (57) ABSTRACT

A computer system where a computer sends out video signal signals in true video format directly to a standard monitor type display device (see DEFINITIONS section) through either a network (wired or wireless or both), or over a wireless connection. In network embodiments, the network may be a local area network ("LAN") a wide area network ("WAN") or a combination of these types. Preferably, the true video signal is in one of the following formats: conventional television type broadcast signal, VGA, xVGA, D-sub 15, RGBHV video signal with DDC2 digital clock and data. Preferably, the true signal sent from the computer to the standard monitor type display device is in analog form.

16 Claims, 5 Drawing Sheets

COMPUTER SYSTEM WITH TRUE VIDEO SIGNALS

RELATED APPLICATION

The present application claims priority to U.S. provisional patent application No. 61/111,608, filed on 5 Nov. 2008; all of the foregoing patent-related document(s) are hereby incorporated by reference herein in their respective entirety(ies).

BACKGROUND OF THE INVENTION

1. Field of the Invention

The present invention relates to networked computer systems, including computer systems implemented over a local area network (wireless and/or wired) and computer systems implemented over a wide area network (wireless and/or wired).

2. Description of the Related Art

In some conventional computer systems, multiple operating systems run on a single set of processing hardware of a single computer. For example, in some conventional computer systems, a piece of software called a "hypervisor" controls the running of multiple operating systems, which operating systems are sometimes called "virtual machines." In some conventional hypervisor-and-virtual-machine computer systems, the virtual machines are "containerized" in that each virtual machine runs substantially independently of the other virtual machine(s) that are run by the common hypervisor. The hypervisor effects its control of the virtual machines by "virtualizing," or, in other words, emulating the actual, physical resources of the hardware upon which the hypervisor runs. By virtualizing the actual resources, the hypervisor can actually communicate with various resources of the computer (see DEFINITIONS section), on behalf of each containerized virtual machine, in series, which is to say, in some sort of time division multiplexed manner At the same time, because the hypervisor communicates with the various, containerized virtual machines through code emulating virtualized hardware, each virtualized machines has no way of detecting the sharing of computer resources. Because of this, the virtualized machine operating systems do not need to be equipped to deal with the fact that they are sharing computer resources. This means that standard, pre-existing operating systems, such as WINDOWS operating systems or LINUX operating systems, may be used for each virtual machine operating system. ("WINDOWS" is used as a trademark of the Microsoft Corporation and may be subject to commonlaw and/or trademark-registration-based trademark rights in various jurisdictions throughout the world.)

Because hypervisors virtualize computer resources, they tend to require a lot of code and processing power in order to fully and accurately emulate the specific resources that they emulate. Furthermore, a given piece of hypervisor software must include code to emulate all of the resources of the computer system upon which it runs. If the hypervisor includes virtualization code for resources that its computer system does not have, then that is an inefficiency because those code portions cannot be allowed to be used by the virtual machines running on the hypervisor. Of more concern is the fact that the hypervisor might be missing code to run certain resources. In fact, if there is too bad of a mismatch between the resources that the hypervisor has code portions to emulate, and the actual resources of the computer system upon which it runs, then the computer system will be inoperable. In this sense, hypervisors tend to be either inefficient (that is, lots of extra code portions), or else inflexible and unrobust (that is, unable to accommodate a wide variety of computer systems having different combinations of resources).

The named inventor of the present application has developed a different kind of computer system for running multiple operating systems and/or multiple, containerized operating systems on a single computer. According to this system, the multiple operating systems communicate more directly with the actual resources of the computer system under the control of a module (for example, a piece of software) called a "controller kernel." The concept of the controller kernel and various preferred embodiments of the computer systems utilizing such a controller kernel are more fully described in the following patent application documents: (i) Ser. No. 12/234,131 (filed Sep. 19, 2008 and published as publication number 2009-0083829 A1 on Mar. 26, 2009); (ii) Ser. No. 12/234,158 (filed Sep. 19, 2008 and published as publication number 2009-0083630 A1 on Mar. 26, 2009); (iii) Ser. No. 12/234,223 (filed Sep. 19, 2008 and published as publication number 2009-0083450 A1 on Mar. 26, 2009); and (iv) U.S. provisional patent application No. 60/973,923, filed on Sep. 20, 2007 (collectively, "Controller Kernel Background Documents"). The Controller Kernel Background Documents are hereby incorporated by reference in their respective entireties to the fullest extent allowed by law.

Figure 1:
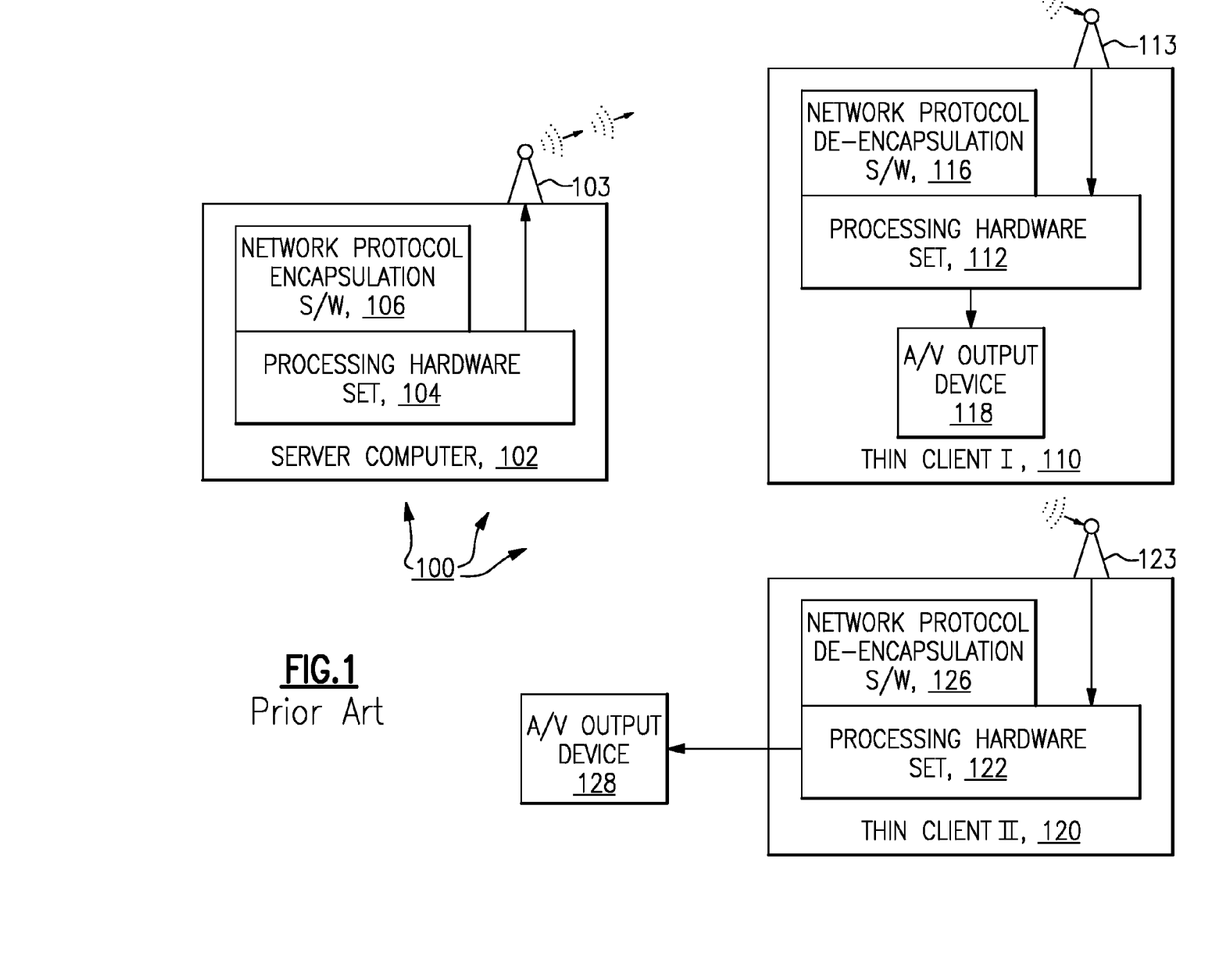
FIG. 1 is a schematic view of a prior art computer system.

FIG. 1 shows a conventional computer system 100 including server computer 102; thin client I 110; thin client II 120; and audio/video ("A/V") output device 128. Server computer 102 includes processing hardware set 104; network protocol encapsulation software 106; and wireless transmitter 103. Thin client I includes: processing hardware set 112; network protocol de-encapsulation software 116; and integral A/V output device 118. In operation, the server computer supplies the bulk of the processing capability for thin client I and thin client II, and communicates with these thin clients over a wireless communication network using some network communication protocol (such as TCP/IP, HTTP).

In the prior art system of FIG. 1, part of the data that is communicated from the server computer to each thin client is a video signal. The video signals are generated by processing hardware set 104 to be in a format such as jpg, bmp, gif, tiff, pcx or other formats that are not suitable for direct display on a standard monitor. Rather, these formats require processing by computer processing hardware before there is a video signal in a "true video" format which is in condition for direct display on a standard monitor. These non-true-video format video signals are sent to network protocol encapsulation software 106, which encapsulates them into a suitable network protocol (for example, TCP/IP, HTTP). The encapsulated video signals are then sent in a tunneling manner out through processing hardware set 104 to wireless transmitter 103. The encapsulated video signals are respectively received by wireless receivers 113 and 123 and sent to respective processing hardware sets 112 and 122. The processing hardware sets have the video signals de-encapsulated by respective network protocol de-encapsulation software 116 and 126 so that they go back to being non-true-video signals not wrapped in a network protocol. The respective processing hardware sets 112 and 122 then convert the non-true-video signals into true video signals (sometimes with the help of appropriate conversion software, not shown). After the video signals are converted into true video signals, they are sent to the respective display devices 118 and 128 where they are displayed to the respective users (not shown) of the thin client terminals. U.S. patent application 2008/0055191 ("Craig") is an example of such a prior art system (see Craig at paragraph 0020).

Description Of the Related Art Section Disclaimer: To the extent that specific publications are discussed above in this Description of the Related Art Section, these discussions should not be taken as an admission that the discussed publications (for example, published patents) are prior art for patent law purposes. For example, some or all of the discussed publications may not be sufficiently early in time, may not reflect subject matter developed early enough in time and/or may not be sufficiently enabling so as to amount to prior art for patent law purposes. To the extent that specific publications are discussed above in this Description of the Related Art Section, they are all hereby incorporated by reference into this document in their respective entirety(ies).

BRIEF SUMMARY OF THE INVENTION

The present invention is directed to a computer system where a computer sends out video signal signals in true video format directly to a standard monitor type display device (see DEFINITIONS section) through either a network (wired or wireless or both), or over a wireless connection. In network embodiments, the network may be a local area network ("LAN") a wide area network ("WAN") or a combination of these types. Preferably, the true video signal is in one of the following formats: conventional television type broadcast signal, VGA, xVGA, D-sub 15, RGBHV video signal with DDC2 digital clock and data. Preferably, the true signal sent from the computer to the standard monitor type display device is in analog form.

Various embodiments of the present invention may exhibit one or more of the following objects, features and/or advantages:

(1) little or no processing power is required at the terminal (s) controlled by the computer because no processing power is required to either de-encapsulate the video signal and/or convert it from non-true-video format into true video format;

(2) because the terminals require little or no processing power, they can be mad in inexpensive forms such as dummy terminal notebooks or dummy netbooks; and (3) inexpensive terminals operating according to the present invention can be used in environments where damage to the terminal hardware is relatively likely, such as a school for educating children.

According to an aspect of the present invention, a computer system includes a computer, a communication network and a first standard monitor type display device. The computer comprises true video transmission software and a network output module. The true video transmission software is programmed to receive a first true video signal, corresponding to a first computer display used in working on a computer and generated by the computer, and output the first true video signal to the network output module in true video form and without encapsulation in a network protocol. The network module is structured, connected and/or programmed to send the first true video signal through the communication network to the first standard monitor type display device. The first standard monitor type display device receives the first true video signal from the communication network and displays it on a display of the first standard monitor type display device.

According to a further aspect of the present invention, a computer system includes a computer and a first standard monitor type display device. The computer comprises true video transmission software and a wireless transmitter. The true video transmission software is programmed to receive a first true video signal, corresponding to a computer display used in working on a computer and generated by the computer, and output the first true video signal to the wireless transmitter in true video form and without encapsulation in a network protocol. The first standard display device comprises a display and a wireless receiver. The wireless receiver of the first standard monitor type display device receives the first true video signal from the wireless transmitter of the computer and displays it on the display of the standard monitor type display device.

BRIEF DESCRIPTION OF THE DRAWINGS

The present invention will be more fully understood and appreciated by reading the following Detailed Description in conjunction with the accompanying drawings, in which.

DETAILED DESCRIPTION OF THE INVENTION

Figure 2:
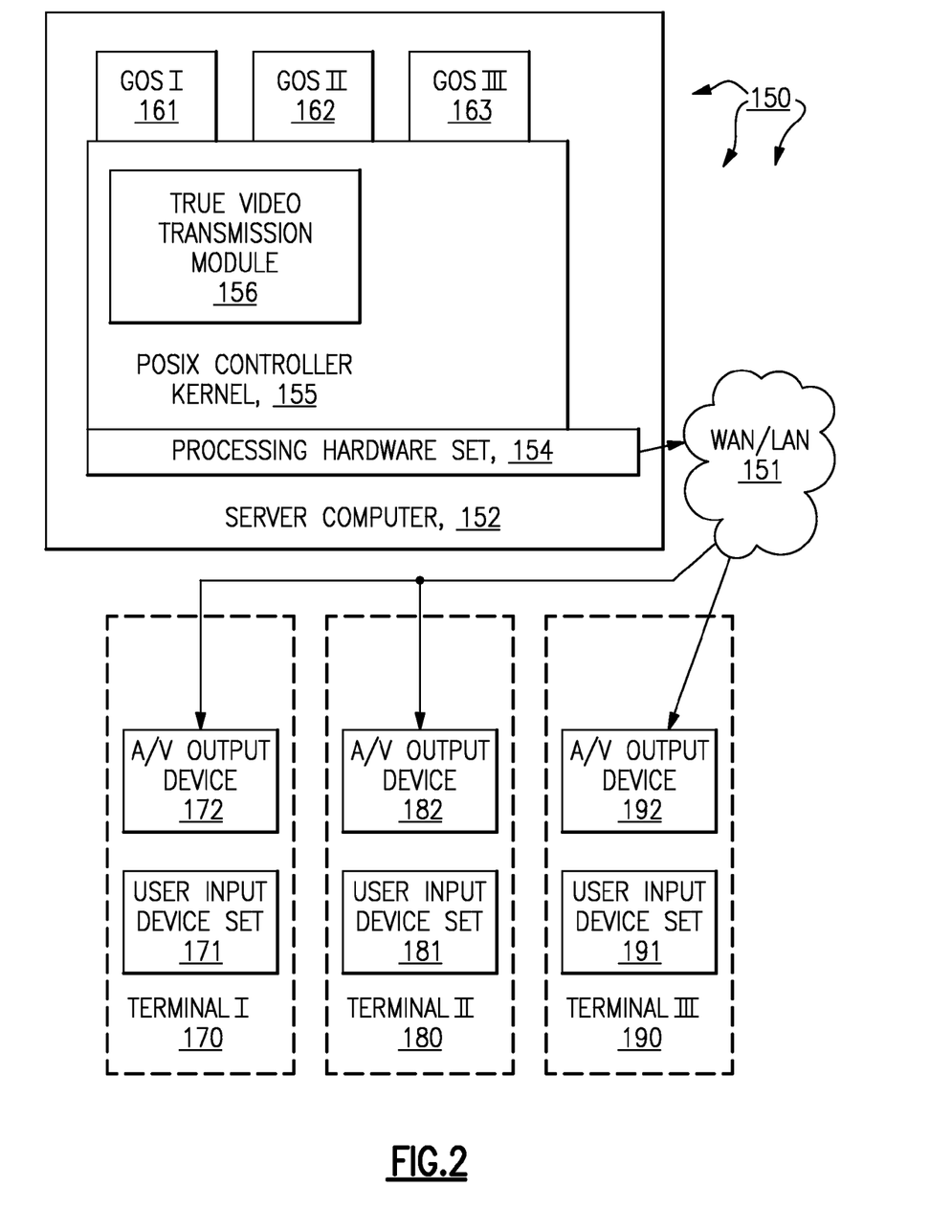
FIG. 2 is a schematic of a first embodiment of a computer system according to the present invention.
Figure 3:
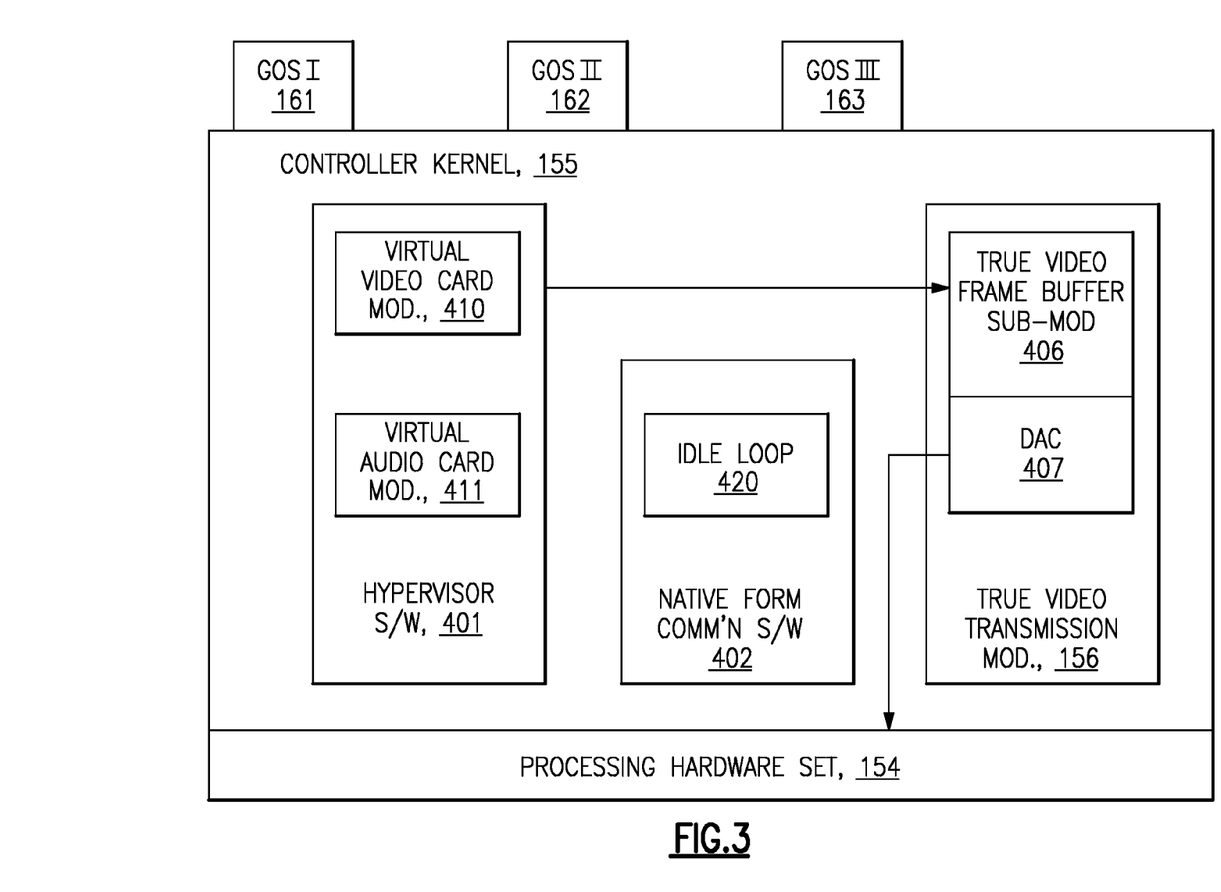
FIG. 3 is a schematic of a controller kernel used in the first embodiment computer system.

FIGS. 2 and 3 show a computer system 150 according to the present invention, including: WAN and/or LAN 151; server computer 152; processing hardware set 154; POSIX controller kernel 155; guest operating system (GOS) I 161; GOS II 162; GOS III 163; terminal I 170; terminal II 180; terminal III 190. The controller kernel includes true video transmission module 156; hypervisor software 401; native form communication software 402; virtual video card module 411; idle loop 420; true video frame buffer sub-module 406; and digital-to-analog converter 407. Terminal I includes: user input device set 171; and A/V output device 172. Terminal II includes: user input device set 181; and A/V output device 182. Terminal III includes: user input device set 191; and A/V output device 192.

In operation, the three GOSs 161, 162, 163 of the server computer run in a "containerized" (that is, at least substantially independent of each other) manner on and under the control of the controller kernel, which controls communications between the controller kernel and the respective GOSs. these containerized GOSs are respectively allocated to the remote terminals 170, 180, 190. In this embodiment the remote terminals are in the form of dumb terminals (see DEFINITIONS section), but, alternatively, they could be thin client terminals or even full-blown personal computer workstations. For the purposes of the present invention, the important part to focus upon is the form in which the terminals get their respective video signals, which are displayed upon their respective standard monitor type display devices 172, 182, 192. More specifically, they get true video signals, which correspond to a computer type display of the type that a user sees when working directly at a personal computer. Now, in system 150, these true video displays come from the server computer which is located at a nearby remote location (LAN embodiments) or a faraway remote location (WAN embodiments). In this embodiment, the network 151 is a wired network, but it could alternatively be a wireless network, or even a wireless broadcast of video signals on different channels corresponding to the respective true video signals, similar to a conventional, old fashioned television broadcast.

The operation of the controller kernel, shown in detail in FIG. 3, will now be discussed. The controller kernel effects communications between the processing hardware set and the GOSs in (at least) two ways: (i) through hypervisor software 401; and (ii) through native form communication software. The operation of the native form communication software is discussed in some detail in the Controller Kernel Background Documents, but summarize this portion of the communication, native form (see DEFINITIONS section) instructions are passed back and forth between the operating system and the containerized GOSs in a controlled fashion by the native form communication software, which preferably: (i) is written in LINUX (even if the GOSs are Windows); and (ii) utilizes an idle loop and interrupt signals so that multiple GOSs can share a single set of processing hardware using native form instructions, but without conflicts.

In controller kernel 155, however, some GOS/processing hardware set communications are handled (in whole or in part) by hypervisor software 401. For example, video related instructions are handled by virtual video card module 410 which virtualizes and emulates a audio card hardware, but at the software level. As a further example, audio related instructions are handled by virtual audio card module 411 which virtualizes and emulates audio card hardware, but at the software level. These virtualized interfaces of the hypervisor software tend to be less efficient than the native form transfer of instructions through the native form communication software, but, for various reasons, there are some instruction transfers that are preferably performed in this virtualized manner.

Within hypervisor software 401, frame buffers having audio and/or video data are generated. It is these frame buffers which are taken by (or copied to) true video frame buffer sub-module 406 of the true video transmission module portion of the controller kernel. The true video frame buffer sub-module uses these frame buffers to make a true video signal (in digital form) corresponding to the video signal that a computer user using the GOS and its associated applications would see. This true video signal (in digital form) is then sent to digital-to-analog converter 407 and converted to a corresponding true video signal in analog form. The true video signal in analog form is sent out to the processing hardware set and thence to WAN/LAN 151 (generally with the help of a network module, that may include hardware and/or software, not separately shown). In some controller kernel embodiments of the present invention (not all embodiments of the present invention necessarily have controller kernels), the true video signal may be sent directly from the computer to the A/V output device. It is noted that the true video signal is not encapsulated in a network protocol, or otherwise put into any form that would require processing so that it could be displayed on a standard monitor type display device.

Figure 4:
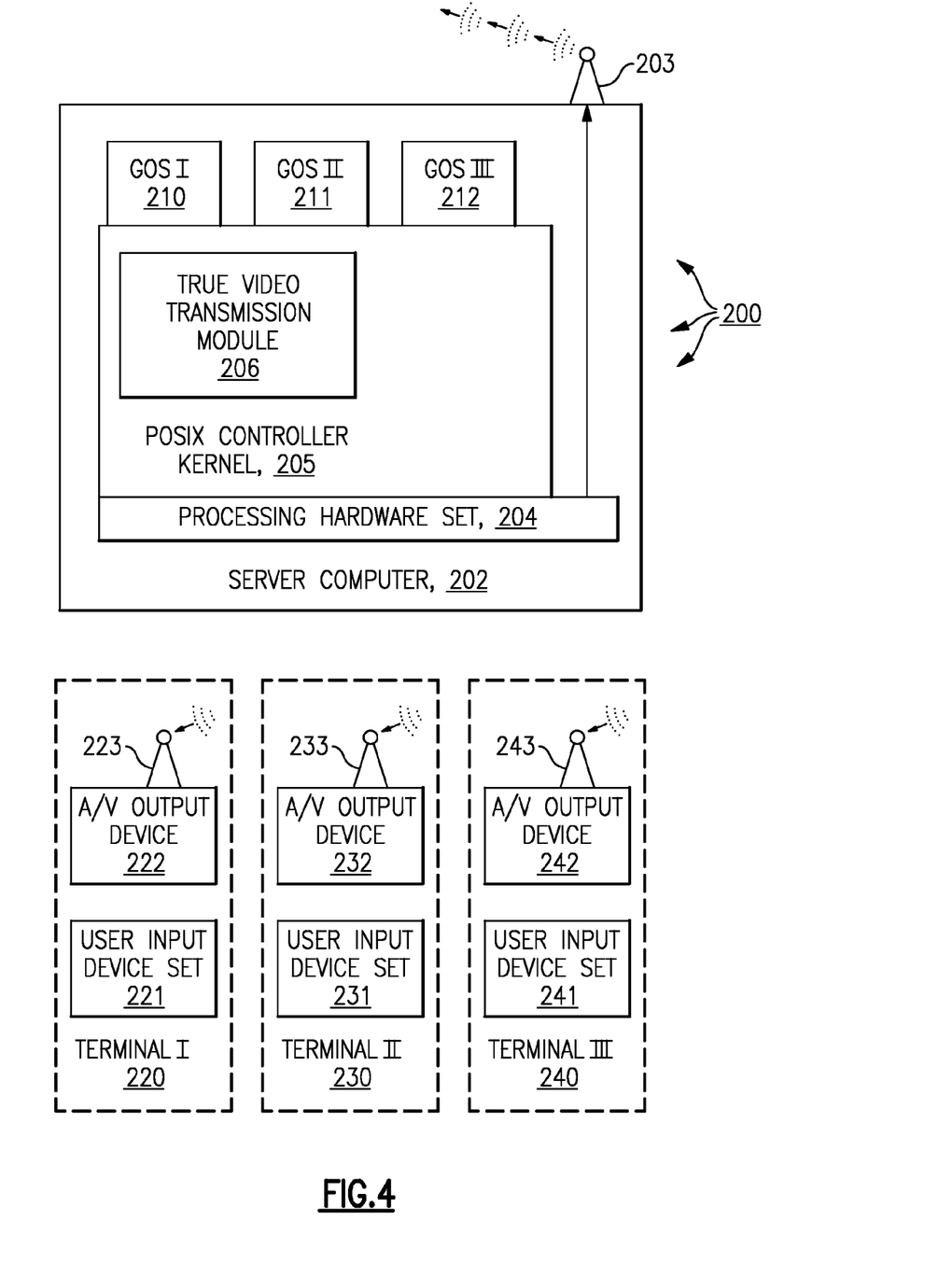
FIG. 4 is a schematic of a second embodiment of a computer system according to the present invention.

FIG. 4 shows another computer system 200 according to the present invention, including: server computer 202; multi-channel wireless transmitter 203; processing hardware set 204; POSIX controller kernel 205; true video transmission module 206; GOS I 210; GOS II 211; GOS III 212; terminal I 220; terminal II 230; and terminal III 240. Terminal I includes user input device set 221; and A/V output device 222. Terminal II includes user input device set 231; and A/V output device 232. Terminal III includes user input device set 241; and A/V output device 242. The operation of the multiple containerized GOSs, the dumb terminals and the generation of the three true video signals to be respectively sent to the three dumb terminals work substantially the same way as explained above in connection with system 150.

However, in system 200, the three true video signals are broadcast on three different channels of wireless transmission, in the manner of a television broadcast. Instead of being sent to a network, the true video signals are sent from true video transmission module 206 to wireless transmitter 203 (which may be built integrally into the body of the server computer, or may be a separate component). Wireless transmitter may be constructed as, for example, wireless transmitter VideoComm TC5800 (made by VideoComm Technologies of Oakville, Ontario, Canada). Preferably, each true video signal is sent on a separate channel, but other ways of multiplexing multiple true video signals may be possible. The true video signals of system 200 are preferably analog, but digital true video signals may also be and/or become susceptible of wireless broadcast.

The preferred bandwidth related allocations (assuming current equipment types and current performance standards) are believed to be: (i) 6 MBPS; and (ii) 20 MHZ per channel (that is, per user). These preferred allocations may change over time as equipment and expected performance standards improve.

The true video signal channels are respectively broadcast to wireless receivers 223, 233, 243, respectively of terminals I, II and III and displayed on A/V output devices 222, 232 and 242. Once again, these A/V output devices are standard monitor type display devices (see DEFINITIONS section) and therefore do not require processing power for processing the video signal before display becomes possible.

Figure 5:
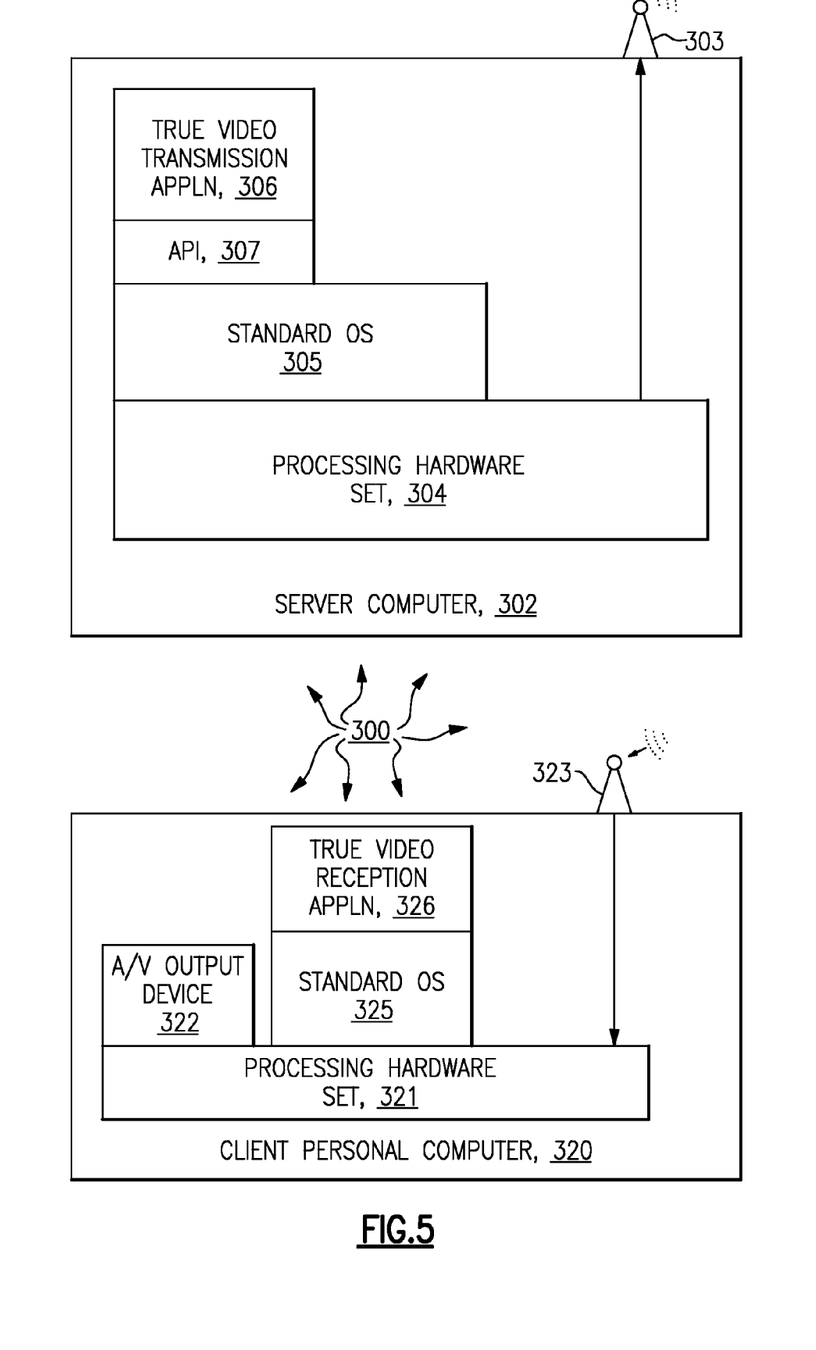
FIG. 5 is a schematic of a third embodiment of a computer system according to the present invention.

FIG. 5 shows computer system 300, which is not necessarily a preferred embodiment, but included primarily to demonstrate some of the possible scope that the present invention may have. System 300 includes server computer 302; processing hardware set 304; standard OS 305; application programming interface (API) 307; true video transmission application 306; wireless transmitter 303; client personal computer 320; processing hardware set 321; A/V output device 322; wireless receiver 323; standard OS 325; and true video reception application. In system 300, it is true video transmission application 306 that generates a true video signal and directs it to be broadcast out from the server computer by its wireless transmitter. Because the true video transmission application sits atop an API and a standard operating system (for example, a LINUX operating system or a Window operating system) in the server computer, it will generally be less efficient at creating the true video signal. The wireless true video signal is received by wireless receiver of the client computer and then sent to the true video reception application of the client computer, which also runs on top of an operating system before being sent to A/V output device 322. Again, the operating system involvement at the receiving end of the video signal may tend to decrease efficiency of the generation of the display on A/V output device 322, but there may be reasons to set up a system that works this way. It is also noted that the presence of processing hardware set 321 in the client computer will tend to increase the cost of the client computer (relative to the cost of a dumb terminal However, there may be reasons for doing this. For example, the operating system of the server computer may run as a mere window in the substantially independent operating system of the client computer, thus giving the client the power of two simultaneous and independent operating systems to work with, while still allowing for the efficiency of remotely-generated, true video signals on the client side in connection with its server computer window.

DEFINITIONS

Any and all published documents mentioned herein shall be considered to be incorporated by reference, in their respective entireties, herein to the fullest extent of the patent law. The following definitions are provided for claim construction purposes:

Present invention: means at least some embodiments of the present invention; references to various feature(s) of the "present invention" throughout this document do not mean that all claimed embodiments or methods include the referenced feature(s).

Embodiment: a machine, manufacture, system, method, process and/or composition that may (not must) meet the embodiment of a present, past or future patent claim based on this patent document; for example, an "embodiment" might not be covered by any claims filed with this patent document, but described as an "embodiment" to show the scope of the invention and indicate that it might (or might not) covered in a later arising claim (for example, an amended claim, a continuation application claim, a divisional application claim, a reissue application claim, a re-examination proceeding claim, an interference count); also, an embodiment that is indeed covered by claims filed with this patent document might cease to be covered by claim amendments made during prosecution.

First, second, third, etc. ("ordinals"): Unless otherwise noted, ordinals only serve to distinguish or identify (e.g., various members of a group); the mere use of ordinals shall not be taken to necessarily imply order (for example, time order, space order).

Electrically Connected: means either directly electrically connected, or indirectly electrically connected, such that intervening elements are present; in an indirect electrical connection, the intervening elements may include inductors and/or transformers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (ii) in a single proximity within a larger piece of software code; (iii) located within a single piece of software code; (iv) located in a single storage device, memory or medium; (v) mechanically connected; (vi) electrically connected; and/or (vii) connected in data communication.

True video: video signal in any form suitable for display on a conventional display without the need for any substantial computational type processing.

Standard monitor type display device: a display device that directly displays a true video signal and does not have the processing capability to convert a non-true-video format video signal into a true video format video signal; may be a conventional monitor for use a personal desktop computer, or it may be built integrally into a laptop, notebook, tablet, netbook or other geometry.

Terminals: sometimes called workstations, these have sufficient user input and output devices so that a user can work at the terminal as if the user is working at a computer, regardless of how much computer processing capability exists within the terminal itself; terminals include, but are not limited to, dumb terminals and thin clients.

Dumb terminals: A terminal with substantially no computer processing capability; however, it is noted that a terminal including a standard LCD monitor and a standard modern computer keyboard would be considered as a dumb terminal even if either or both of these devices turned out to have some processing power to perform their respective functions as a display device and a user input device.

Thin client: A terminal with some computer processing power, but much less than a typical personal computer; for example, a thin client might have a processor for the purposes of, and only sufficient to, de-encapsulating and encapsulating data received from a network in a network protocol and data transmitted to the network in network protocol.

Controller kernel: Includes, but is not necessarily limited to POSIX kernels that include an idle loop for routing native form instructions in a controlled manner Native form: a form of instructions that can be operatively received by and/or is output from processing hardware directly and without any sort of translation or modification to form by software running on the hardware; generally speaking, different processing hardware types are characterized by different native forms.

To the extent that the definitions provided above are consistent with ordinary, plain, and accustomed meanings (as generally shown by documents such as dictionaries and/or technical lexicons), the above definitions shall be considered supplemental in nature. To the extent that the definitions provided above are inconsistent with ordinary, plain, and accustomed meanings (as generally shown by documents such as dictionaries and/or technical lexicons), the above definitions shall control.

Unless otherwise explicitly provided in the claim language, steps in method steps or process claims need only be performed in the same time order as the order the steps are recited in the claim only to the extent that impossibility or extreme feasibility problems dictate that the recited step order be used. This broad interpretation with respect to step order is to be used regardless of whether the alternative time ordering (s) of the claimed steps is particularly mentioned or discussed in this document—in other words, any step order discussed in the above specification shall be considered as required by a method claim only if the step order is explicitly set forth in the words of the method claim itself. Also, if some time ordering is explicitly set forth in a method claim, the time ordering claim language shall not be taken as an implicit limitation on whether claimed steps are immediately consecutive in time, or as an implicit limitation against intervening steps.

What is claimed is:

1. A computer system comprising a computer, a communication network and a first standard monitor type display device, wherein:
   the computer comprises a true video transmission module and a network output module;
   the true video transmission module is structured and/or programmed to receive a first true video signal, corresponding to a first computer display used in working on a computer and generated by the computer, and output the first true video signal to the network output module in true video form and without encapsulation in a network protocol;

the network module is structured, connected and/or programmed to send the first true video signal through the communication network to the first standard monitor type display device;

the first standard monitor type display device receives the first true video signal from the communication network and displays an image corresponding to the first true video signal on a display of the first standard monitor type display device;

the computer further comprises a processing hardware set, a controller kernel and a first guest operating system;

the first true video signal corresponds to a first computer display used in working on a computer through the first guest operating system;

the controller kernel runs directly on the processing hardware set;

the true video transmission module is included in the controller kernel; and the first guest operating system communicates with the processing hardware set at least in part by exchanging instructions in native form with the processing hardware set through and under the control of the controller kernel.

2. The system of claim 1 wherein the true video transmission module comprises a true video frame buffer sub-module structured and/or programmed to receive a plurality of frame buffers corresponding to the first true video signal from elsewhere in the controller kernel.

3. The system of claim 2 wherein the true video frame buffer module further comprises a digital-to-analog converter sub-module structured and/or programmed to receive the plurality of frame buffers corresponding to the first true video signal from true video frame buffer sub-module and to convert the plurality of frame buffers from a first true video signal in digital form to a first true video signal in analog form.

4. The system of claim 1 wherein:
the controller kernel comprises hypervisor software;
the hypervisor software is programmed to virtualize and communicate audio and video related instructions between the first guest operating system and the processing hardware set; and
the hypervisor software is further programmed to send a plurality of frame buffers corresponding to the first true video signal to the true video transmission module.

5. The system of claim 4 wherein the true video transmission module comprises a true video frame buffer sub-module structured and/or programmed to receive the plurality of frame buffers corresponding to the first true video signal from the hypervisor software of the controller kernel.

6. The system of claim 1 further comprising a second standard monitor type display device, wherein:
the computer further comprises a second guest operating system;
the second guest operating system communicates with the processing hardware set at least in part by exchanging instructions in native form with the processing hardware set through and under the control of the controller kernel;
the true video transmission software module is further structured and/or programmed to receive a second true video signal, corresponding to a second computer display used in working on a computer through the second guest operating system, and to output the second true video signal to the network output module in true video form and without encapsulation in a network protocol;
the network module is structured, connected and/or programmed to send the second true video signal through the communication network to the second standard monitor type display device; and
the second standard monitor type display device receives the second true video signal from the communication network and displays it on a display of the second standard monitor type display device.

7. The system of claim 6 wherein:
the controller kernel controls the first and second guest operating systems so that they are containerized with respect to each other; and
the controller kernel comprises an idle loop programmed to communicate native form instructions between the processing hardware set and the first and second guest operating systems in a way that allows the first and second guest operating systems to run concurrently in a containerized manner.

8. A computer system comprising a computer and a first standard monitor type display device, wherein:
the computer comprises true video transmission software and a wireless transmitter;
the true video transmission module is structured and/or programmed to receive a first true video signal, corresponding to a computer display used in working on a computer and generated by the computer, and output the first true video signal to the wireless transmitter in true video form and without encapsulation in a network protocol;
the first standard display device comprises a display and a wireless receiver;
the wireless receiver of the first standard monitor type display device receives the first true video signal from the wireless transmitter of the computer and displays an image corresponding to the first true video signal on the display of the first standard monitor type display device;
the computer further comprises a processing hardware set, a controller kernel and a first guest operating system;
the controller kernel runs directly on the processing hardware set;
the true video transmission module is included in the controller kernel; and
the first guest operating system communicates with the processing hardware set at least in part by exchanging instructions in native form with the processing hardware set through and under the control of the controller kernel.

9. The system of claim 8 wherein the true video transmission module comprises a true video frame buffer sub-module structured and/or programmed to receive a plurality of frame buffers corresponding to the first true video signal from elsewhere in the controller kernel.

10. The system of claim 9 wherein the true video frame buffer module further comprises a digital-to-analog converter sub-module structured and/or programmed to receive the plurality of frame buffers corresponding to the first true video signal from true video frame buffer sub-module and to convert the plurality of frame buffers from a first true video signal in digital form to a first true video signal in analog form.

11. The system of claim 8 wherein:
the controller kernel comprises hypervisor software;
the hypervisor software is programmed to virtualize and communicate audio and video related instructions between the first guest operating system and the processing hardware set; and
the hypervisor software is further programmed to send a plurality of frame buffers corresponding to the first true video signal to the true video transmission module.

12. The system of claim 11 wherein the true video transmission module comprises a true video frame buffer sub-module structured and/or programmed to receive the plurality of frame buffers corresponding to the first true video signal from the hypervisor software of the controller kernel.

13. The system of claim 8 further comprising a second standard monitor type display device, wherein:
the computer further comprises a second guest operating system;
the second guest operating system communicates with the processing hardware set at least in part by exchanging instructions in native form with the processing hardware set through and under the control of the controller kernel;
the true video transmission software module is further structured and/or programmed to receive a second true video signal, corresponding to a second computer display used in working on a computer through the second guest operating system, and to output the second true video signal to the network output module in true video form and without encapsulation in a network protocol;
the network module is structured, connected and/or programmed to send the second true video signal through the communication network to the second standard monitor type display device; and
the second standard monitor type display device receives the second true video signal from the communication network and displays it on a display of the second standard monitor type display device.

14. The system of claim 13 wherein:
the controller kernel controls the first and second guest operating systems so that they are containerized with respect to each other; and
the controller kernel comprises an idle loop programmed to communicate native form instructions between the processing hardware set and the first and second guest operating systems in a way that allows the first and second guest operating systems to run concurrently in a containerized manner.

15. A computer system comprising a computer and a plurality of dummy terminals, wherein:
the computer comprises true video transmission software, a wireless transmitter, a processing hardware set, a controller kernel and a plurality of guest operating systems;
the controller kernel runs directly on the processing hardware set;
the true video transmission module is included in the controller kernel;
each guest operating system of the plurality of guest operating systems communicates with the processing hardware set at least in part by exchanging instructions in native form with the processing hardware set through and under the control of the controller kernel;
the true video transmission module is structured and/or programmed to receive a plurality of true video signals, the plurality of true video signals respectively corresponding to a plurality of computer displays respectively corresponding to the plurality of guest operating systems, and to output the plurality of true video signals to the wireless transmitter in true video form and without encapsulation in a network protocol;
each dummy terminal of the plurality of dummy terminals comprises a display and a wireless receiver; and
the wireless receiver of each dummy terminal of the plurality of dummy terminals respectively receives its corresponding true video signal from the wireless transmitter of the computer and displays it on the display of the dummy terminal.

16. The system of claim 15 wherein:
the controller kernel is written in POSIX; and
each guest operating system of the plurality of guest operating systems is a Windows operating system.

* * * * *